J. Renshaw,

Pipe Cutter.

N° 46,703. Patented Mar. 7, 1865.

Witnesses:
Henry Morris
C. L. Topliff

Inventor:
Joseph Renshaw
per Munn & Co.
attorneys

UNITED STATES PATENT OFFICE.

JOSEPH RENSHAW, OF MICHIGAN CITY, INDIANA.

IMPROVED TOOL FOR CUTTING OFF STAY AND OTHER BOLTS.

Specification forming part of Letters Patent No. 46,703, dated March 7, 1865.

*To all whom it may concern:*

Be it known that I, JOSEPH RENSHAW, of Michigan City, in the county of La Porte and State of Indiana, have invented a new and useful Improvement in Machines or Tools for Cutting off Stay and other Bolts; and I do hereby declare that the following is a full, clear, and exact description thereof, which will enable others skilled in the art to make and use the same, reference being had to the accompanying drawings, forming part of this specification, in which—

Figure 1:
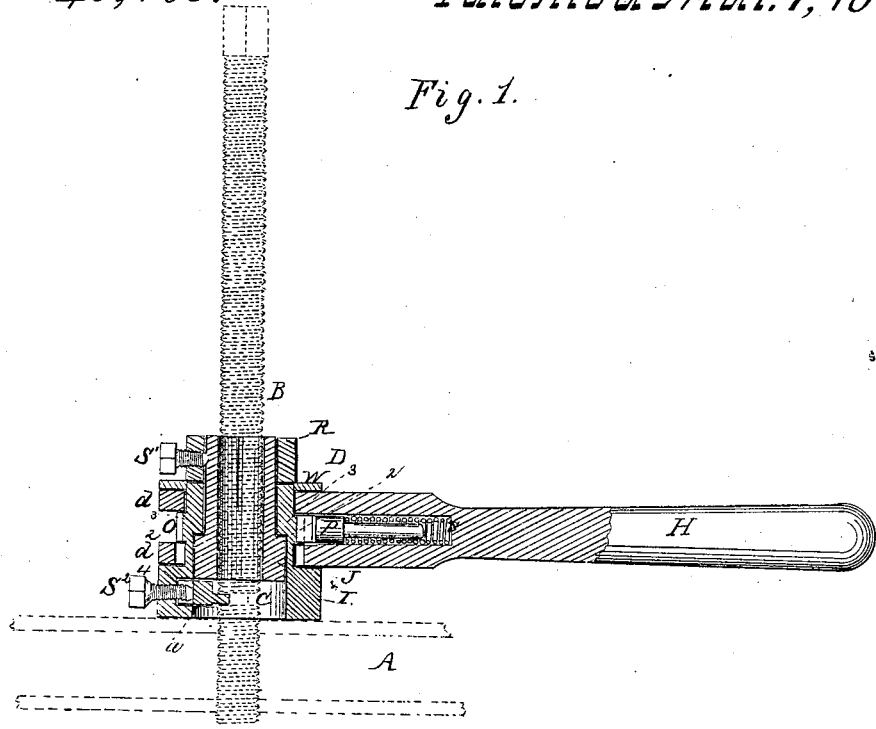
Figure 2:
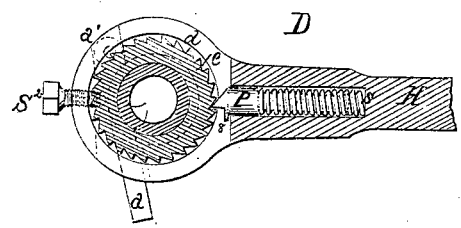
Figure 3:
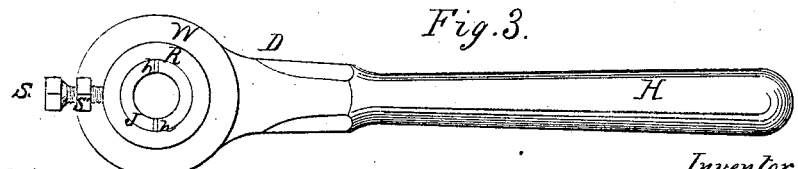

Figure 1 represents a sectional elevation of my cutter through its axis, a portion of a fire-box of a steam-boiler being shown, on which the tool is supposed to be employed. Fig. 2 is a plan of a section on a horizontal line through the ratchet-wheel and the axis of the handle. Fig. 3 is a plan view of the tool.

Similar letters of reference indicate like parts.

The numerous stay-bolts in the fire-box sheets of steam-boilers are usually cut off after their ends are screwed to their proper place by a cold-chisel and hammer. This method of cutting them off is slow and expensive work, and the rest of the bolt is usually injured by reason of the jamming of the threads, so as to require trimming before it can be again inserted in the sheets. Besides this, that portion of the bolt which enters the sheets and the sheets themselves are subjected to injurious strains by the old method, owing to the successive and violent blows of the workman in cutting off the bolt, and the bolts are thereby often loosened in their holes and the holes altered in their outline, whereby it becomes necessary in riveting them upon the sheets to subject the bolts to an excessive amount of hammering, which is injurious to them.

My invention provides against these injurious tendencies and the disadvantages of the present mode of doing this sort of work.

In the drawings, A represents a section of a portion of a fire-sheet with my cutting-tool D applied thereto, and a bolt, B, about being cut off by it. The tool is composed of an annular stock, I, whose base is to rest upon or over the fire-box sheet, and whose sides are slotted, as shown in dotted outline in Fig. 2, and in the sectional Fig. 1, to receive a cutting-tool, $a$, which is passed through the slot, so that its cutting-edge shall project within the hollow part of the stock I, the head of the cutter being pivoted in the side of the stock at $a'$, about which point it moves as about a center. The slot at the other side of the stock is lengthened, as shown in Fig. 2, so as to allow the cutting-edge to be advanced to the axial line of the stock upon being forced up by the bearing-screw $s^2$, which passes through the side of the stock and presses against the back of the cutter opposite its cutting-edge. The stock is turned down above a line, 4, on its circumference, so that the lower ring $d$ of a handle, H, which embraces the stock, shall have a bearing thereon in its rotation. The handle H is forked or slotted between its rings $d$, in order to expose a ratchet-wheel, $e$, cut upon the circumference of the stock between the faces of the rings. A slot, S, is formed in the shank of the handle H between the rings, in which is set a pawl, P, upon whose shank is a spiral spring, which is held between a shoulder on the shank of the pawl and the bottom of the slot. A stop, 8, is formed on the pawl near its outer end, which limits the distance to which the shank of the pawl shall enter its slot. The face of the pawl is inclined on one side and straight on the opposite side, so as to form a chisel-edge, which articulates with the teeth of the ratchet, and impels it when the handle is turned in one direction and slips over it when turned in the reverse direction.

The interior of the stock I is formed with a shoulder, 3, which receives a shoulder, 2, formed on the outside of an annular clasp or clasp-sleeve, J, which is to be inserted within the stock from below until its shoulder abuts against the shoulder of the stock, in which position it is secured by the upper side of the cutter $a$, as shown in Fig. 1.

The upper part of the sleeve is thinner above its shoulder 2 than at the part below by the depth of the shoulder, and it is slotted down its opposite sides at $h$, so as to be capable of compression at its upper part.

The stock I rises to a height slightly above the upper edge of the upper ring $d$ of the handle to receive a ring or washer, W, which rests upon the upper ring $d$ of the handle and is flush with the upper edge of the stock. A securing ring, R, fits around the top of the sleeve J and rests upon the top of the stock I and upon the inner edge of the ring or washer W, so as to confine the latter in its place. A set-screw, *s'*, passing through the ring R, not only secures the several parts of the machine together, but also compresses the sides of the sleeve, so that when the tool is passed over a bolt, B, which is to be cut off it is made to clasp it securely by turning the screw *s'*. When so secured to the bolt, the operation of cutting it off is ready to be proceeded with.

By removing the clasp-sleeve J and substituting another whose inner diameter is greater or less the same stock and its attachments can be used for cutting off bolts of different sizes.

The bolt, after being cut off by my machine, is left trimmed in good condition for entering the sheets again, the threads of its screw being uninjured and as perfect as when it left the lathe.

My machine or tool can be applied to cutting any other bolts or screws over which it can be set or to which it can be secured.

I claim as new and desire to secure by Letters Patent—

1. The clasp-sleeve for holding the tool to the bolt to be cut, constructed substantially as described.

2. The combination of the clasp sleeve and the stock I, substantially as described.

JOSEPH RENSHAW.

Witnesses:
DAN KENNEDY,
P. DORAN.